United States Patent
Chen et al.

(10) Patent No.: US 11,063,772 B2
(45) Date of Patent: Jul. 13, 2021

(54) MULTI-CELL PER BIT NONVOLATILE MEMORY UNIT

(71) Applicant: eMemory Technology Inc., Hsin-Chu (TW)

(72) Inventors: Chih-Hsin Chen, Changhua County (TW); Tsung-Mu Lai, Hsinchu County (TW); Shih-Chen Wang, Taipei (TW)

(73) Assignee: eMemory Technology Inc., Hsin-Chu (TW)

( * ) Notice: Subject to any disclaimer, the term of this patent is extended or adjusted under 35 U.S.C. 154(b) by 445 days.

(21) Appl. No.: 16/001,933

(22) Filed: Jun. 6, 2018

(65) Prior Publication Data

US 2019/0164981 A1 May 30, 2019

Related U.S. Application Data

(60) Provisional application No. 62/590,402, filed on Nov. 24, 2017.

(51) Int. Cl.
*H01L 27/11524* (2017.01)
*H04L 9/32* (2006.01)
(Continued)

(52) U.S. Cl.
CPC ........ *H04L 9/3278* (2013.01); *G11C 11/5621* (2013.01); *G11C 16/0483* (2013.01);
(Continued)

(58) Field of Classification Search
CPC .................. H01L 27/11524; H01L 29/0649
See application file for complete search history.

(56) References Cited

U.S. PATENT DOCUMENTS 7,460,396 B2  12/2008  Oka
8,043,914 B2  10/2011  Choi
(Continued)

FOREIGN PATENT DOCUMENTS

CN    1495907 A    5/2004
CN    105261618 A  1/2016
(Continued)

OTHER PUBLICATIONS

Basel Halak, Mark Zwolinski and M. Syafiq Mispan, overview of puf-based hardware security solutions for the internet of things, <2016 IEEE 59th International Midwest Symposium on Circuits and Systems (MWSCAS) >, Oct. 16-19, 2016, Abu Dhabi,UAE.
Liu, Ming; Non-Volatile Memory Technology; Optics & Optoelectronic Technology; vol. 14, No. 5, pp. 6-9, Oct. 2016.

*Primary Examiner* — Errol V Fernandes
(74) *Attorney, Agent, or Firm* — Winston Hsu

(57) ABSTRACT

A multi-cell per bit nonvolatile memory (NVM) unit includes a select transistor disposed on a first oxide define (OD) region, a word line transistor disposed on the first OD region, and serially connected floating gate transistors disposed between the select transistor and the word line transistor. A first floating gate extension continuously extends toward a second OD region and adjacent to an erase gate region. A second floating gate extension continuously extends toward a third OD region and is capacitively coupled to a control gate region. A channel length of each of the floating gate transistors is shorter than that of the select transistor or the word line transistor.

18 Claims, 9 Drawing Sheets

(51) Int. Cl.
    *H04L 9/08*       (2006.01)
    *H04L 9/30*       (2006.01)
    *H04L 29/06*     (2006.01)
    *G11C 11/56*     (2006.01)
    *G11C 16/04*     (2006.01)
    *H01L 29/06*     (2006.01)
    *H01L 29/423*    (2006.01)
    *H01L 29/49*     (2006.01)
    *H02H 9/04*      (2006.01)

(52) U.S. Cl.
    CPC .... *H01L 27/11524* (2013.01); *H01L 29/0649* (2013.01); *H01L 29/42328* (2013.01); *H01L 29/4916* (2013.01); *H02H 9/046* (2013.01); *H04L 9/0866* (2013.01); *H04L 9/0877* (2013.01); *H04L 9/3073* (2013.01); *H04L 63/062* (2013.01)

(56) References Cited

U.S. PATENT DOCUMENTS

| | | | |
|---|---|---|---|
| 2006/0176739 A1 | 8/2006 | Lee | |
| 2007/0058441 A1* | 3/2007 | Oka | H01L 27/11521 365/185.28 |
| 2012/0236646 A1* | 9/2012 | Hsu | H01L 29/66825 365/185.14 |
| 2015/0255472 A1 | 9/2015 | Park | |
| 2016/0240544 A1 | 8/2016 | Park | |

FOREIGN PATENT DOCUMENTS

| | | |
|---|---|---|
| TW | 201426913 A | 7/2014 |
| TW | 201513269 A | 4/2015 |
| TW | 201545281 A | 12/2015 |
| TW | 201637177 A | 10/2016 |

\* cited by examiner

| Mode | $V_{CL}$ | $V_{EL}$ | $V_{SG}$ | $V_{WL}$ | $V_{SL}$ | $V_{BL}$ | $V_{P\text{-}Sub}$ | Mechanism |
|---|---|---|---|---|---|---|---|---|
| PGM | $V_{PP}$ | $V_{PP}$ | $V_{DD}$ | $V_{DD}$ | 0 | 0 | 0 | FN |
| PGM inhibit | $V_{PP}$ | $V_{PP}$ | $V_{DD}$ | $V_{DD}$ | $V_{DD}$ | $V_{DD}$ | 0 | |
| ERS | 0 | $V_{PP}$ | $V_{DD}$ | $V_{DD}$ | 0 | 0 | 0 | FN |
| Read | $0\sim V_{DD}$ | $0\sim V_{DD}$ | $V_{DD}$ | $V_{DD}$ | 0 | $V_{DD}$ | 0 | |
| $0 < V_{DD} < V_{PP}$ | | | | | | | | |

FIG. 5

MULTI-CELL PER BIT NONVOLATILE MEMORY UNIT

CROSS REFERENCE TO RELATED APPLICATIONS

This application claims the benefit of U.S. provisional application No. 62/590,402 filed Nov. 24, 2017.

BACKGROUND OF THE INVENTION

1. Field of the Invention

The present invention relates generally to the field of semiconductor memory technology. Embodiments of this invention are more specifically directed to a single-poly, multi-cell per bit nonvolatile memory (NVM) device.

2. Description of the Prior Art

Nonvolatile memory is widely applied in various electrical apparatus because it can retain information even no power is supplied thereto. According to the limit of programming times, nonvolatile memory is divided into multi-time programmable (MTP) memory and one-time programmable (OTP) memory. MTP is multi-readable and multi-writable. Typically, MTP has a single charge storage region for writing and reading information (i.e. 1 cell/bit).

A prior art nonvolatile memory cell comprises one floating gate transistor for storing electric charge such as electrons, and one or two select transistors for enabling the floating gate transistor to perform corresponding operations. The floating gate may be controlled by coupling elements for program operations and erase operations. The state of the transistor is defined by charge trapped at the floating gate.

An important property of nonvolatile memories is the data retention, which is defined as the time during which the written information is still present to a sufficient degree at the floating gate. In general, the leakage current which causes the electric charge to disappear from the floating gate should be so small that the memory can remain in use without rewriting during a period of several years, for example, ten years.

However, continued device scaling demands that gate oxide layer becomes thinner and thinner. Thin gate oxide layer deteriorates the loss of electric charge at the floating gate due to tunneling of electrons from the floating gate to the substrate. Repeated program (PGM)/erase (ERS) operations also compromise reliability of a memory. As the number of rewrite cycles increases beyond a certain limit, the differences between program and erase state would become too small to be recognized, causing endurance failures. Therefore, there is a need in this industry to improve the data retention characteristics of the nonvolatile memory.

SUMMARY OF THE INVENTION

It is one objective of the invention to provide an improved single-poly, multi-cell per bit nonvolatile memory unit with serially connected storage cells and reduced memory unit area.

According to one aspect of the invention, a multi-cell per bit nonvolatile memory (NVM) unit is disclosed. The multi-cell per bit nonvolatile memory (NVM) unit includes a semiconductor substrate comprising a first oxide define (OD) region, a second oxide define (OD) region, and a third oxide define (OD) region separated from one another by a trench isolation region. The first, second and third OD regions are in parallel to one another and extend along a first direction. The first OD region is situated between the second OD region and the third OD region. A select transistor is disposed on the first OD region. A word line transistor is disposed on the first OD region. Multiple serially connected, single-poly floating gate transistors are disposed between the select transistor and the word line transistor. The single-poly floating gate transistors are disposed on the first OD region. Each of the single-poly floating gate transistors comprises a first floating gate extension continuously extending toward the second OD region along a second direction and adjacent to an erase gate region disposed in the second OD region. Each of the single-poly floating gate transistors comprises a second floating gate extension continuously extending toward the third OD region along the second direction. The second floating gate extension is capacitively coupled to a control gate region in the third OD region.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings:

FIG. 5 is a table showing operating conditions for programming, erasing or reading the single-poly, multi-cell per bit NVM unit according to one embodiment of the invention;

DETAILED DESCRIPTION

Figure 1:
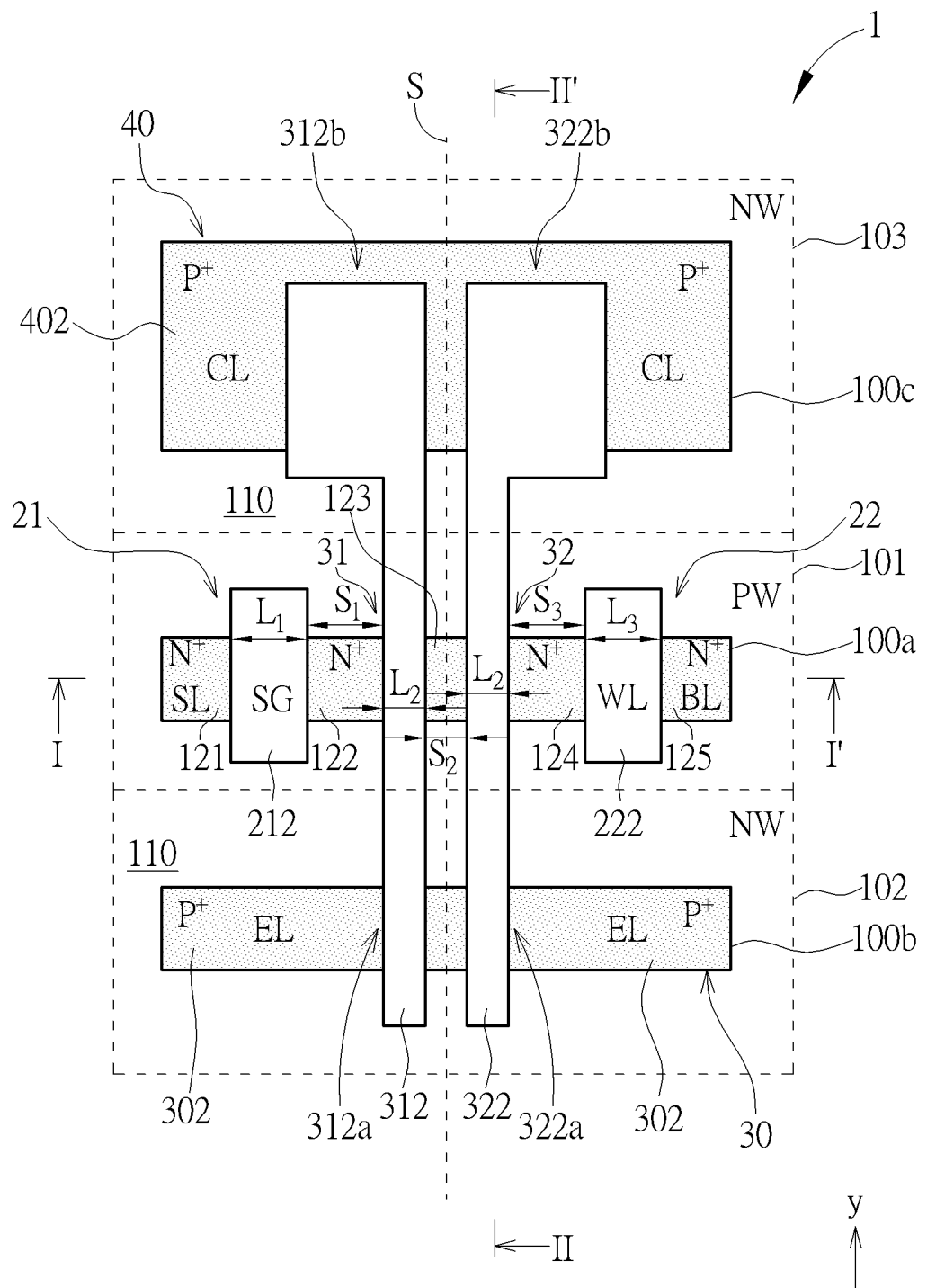
FIG. 1 is a schematic layout diagram showing an exemplary single-poly, multi-cell per bit non-volatile memory (NVM) unit according to one embodiment of the invention.

In the following description, numerous specific details are given to provide a thorough understanding of the invention. It will, however, be apparent to one skilled in the art that the invention may be practiced without these specific details. Furthermore, some system configurations and process steps are not disclosed in detail, as these should be well-known to those skilled in the art. Other embodiments may be utilized and structural, logical, and electrical changes may be made without departing from the scope of the present invention.

Likewise, the drawings showing embodiments of the apparatus are semi-diagrammatic and not to scale and some dimensions are exaggerated in the figures for clarity of presentation. Also, where multiple embodiments are disclosed and described as having some features in common, like or similar features will usually be described with like reference numerals for ease of illustration and description thereof.

The term "oxide define (OD) region" ("OD" region is sometimes referred to as "oxide defined" region or "oxide definition" region) is commonly known in this technical field to be defined as a region on a silicon main surface of a substrate other than a local oxidation of silicon (LOCOS) or a shallow trench isolation (STI) region. The term "oxide define (OD) region" is also commonly referred to as an "active area" where the active circuit elements such as transistors are formed and operated.

Figure 2:
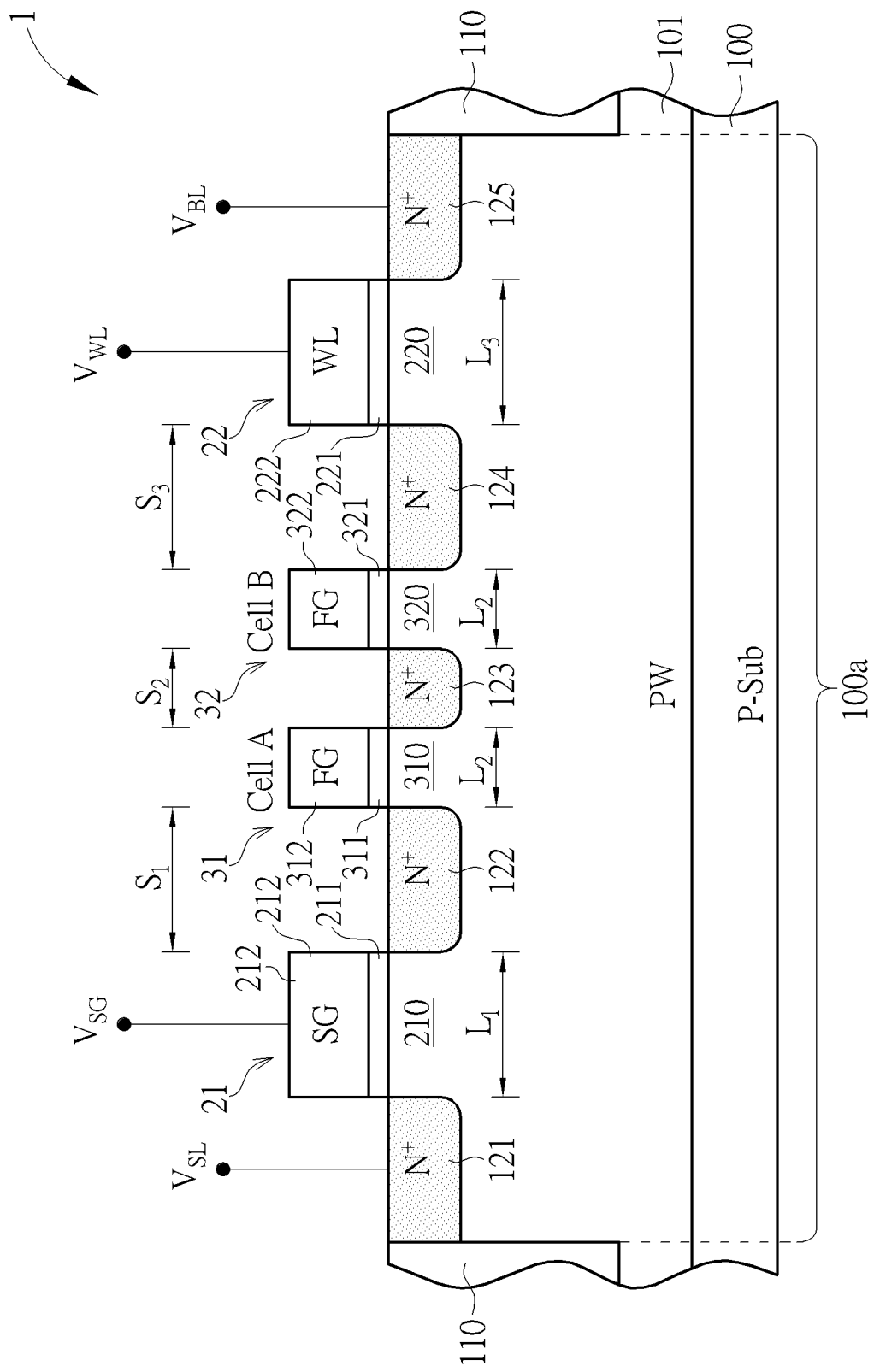
FIG. 2 is a schematic, cross-sectional view taken along line I-I' of FIG. 1.
Figure 3:
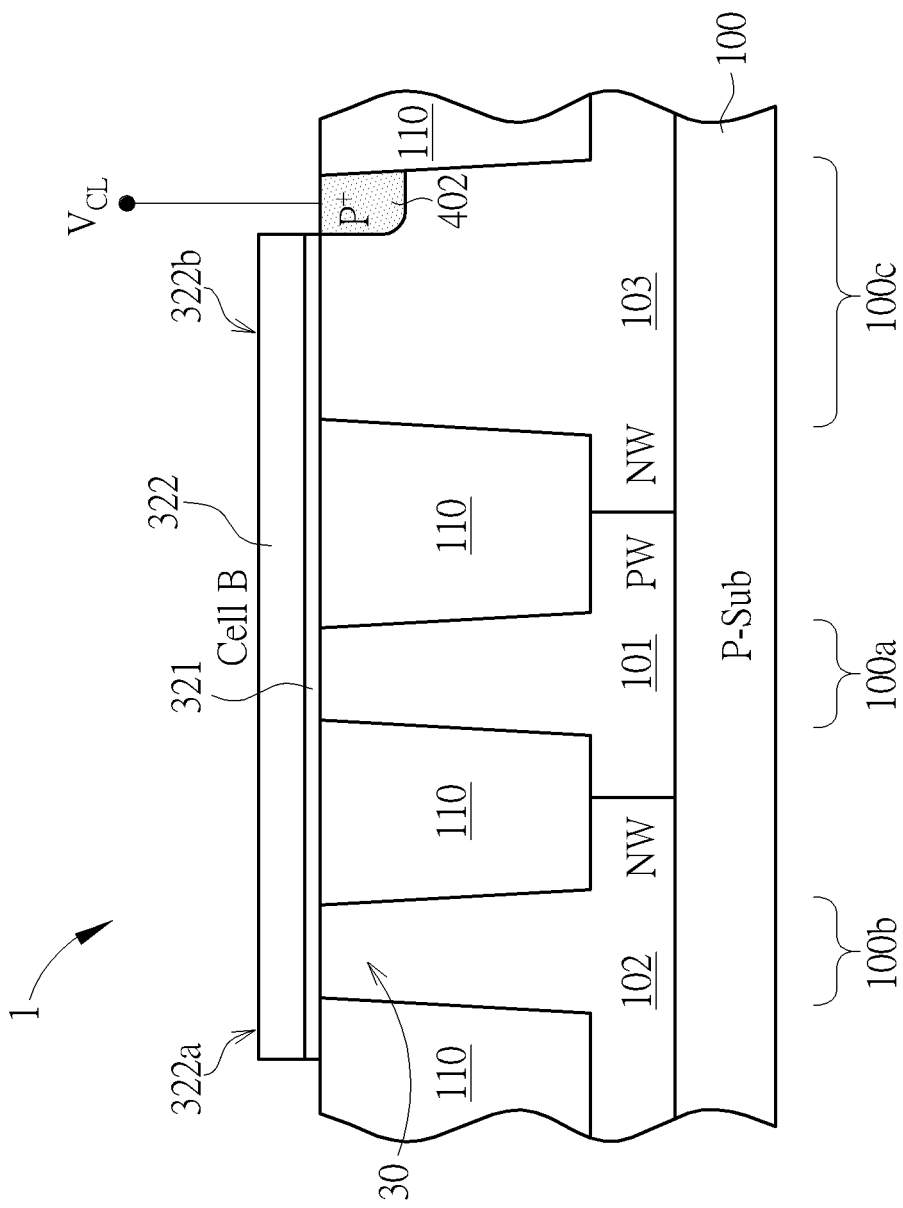
FIG. 3 is a schematic, cross-sectional view taken along line II-II' of FIG. 1.
Figure 4:
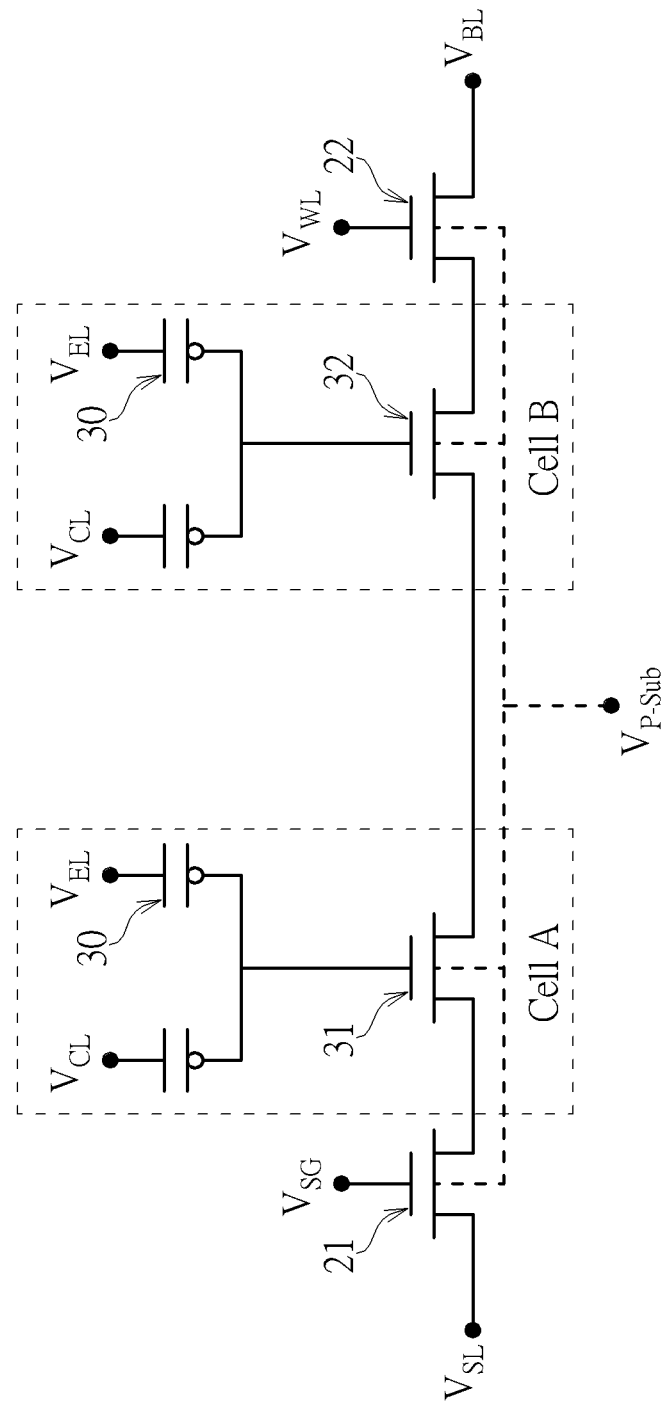
FIG. 4 is an equivalent circuit diagram of the single-poly, multi-cell per bit NVM unit in FIG. 1.

FIG. 1 is a schematic plan view showing an exemplary layout of a single-poly, multi-cell per bit nonvolatile memory (NVM) unit in accordance with one embodiment of this invention. FIG. 2 is a schematic, cross-sectional view taken along line I-I' of FIG. 1. FIG. 3 is a schematic, cross-sectional view taken along line II-II' of FIG. 1. FIG. 4 is an equivalent circuit diagram of the single-poly, multi-cell per bit NVM unit in FIG. 1.

The demonstrated NVM cell structure may function as a multi-time programmable (MTP) memory unit. It is to be understood that the present invention may be applicable to other memory devices. Although FIG. 1 to FIG. 4 show an exemplary 2-cell per bit NVM unit, it is understood that the number of the serially connected storage cells may be greater than 2 depending upon design requirements.

As shown in FIG. 1 to FIG. 4, the single-poly, multi-cell per bit nonvolatile memory (NVM) unit 1 is fabricated on a semiconductor substrate 100 of a first conductivity type such as a P type doped silicon substrate (P-Sub). At least three isolated oxide define (OD) regions 100a, 100b and 100c, which are separated from one another by trench isolation region 110, are provided on the semiconductor substrate 100. The oxide define (OD) regions 100a, 100b and 100c are in parallel to one another and extend along a first direction or the reference x-axis. The single-poly, multi-cell per bit NVM unit 1 is fabricated on the three OD regions 100a, 100b and 100c.

According to the illustrative embodiment, the single-poly, multi-cell per bit NVM unit 1 may have a symmetric layout with respect to an imaginary central line S. According to the illustrative embodiment, the trench isolation region 110 may be a shallow trench isolation (STI) region, but should not be limited thereto.

As shown in FIG. 1 and FIG. 3, according to the illustrative embodiment, the OD region 100a is formed within an ion well 101 of the first conductivity type such as a P well (PW), the OD region 100b is formed within an ion well 102 of a second conductivity type such as an N well (NW), and the OD region 100c is formed within an ion well 103 of the second conductivity type such as an N well (NW). According to the illustrative embodiment, the depth of the ion wells 101, 102 and 103 may be deeper than the bottom of the STI region, but is not limited thereto. In operation, a substrate voltage $V_{P-Sub}$ is applied to the semiconductor substrate 100.

As shown in FIG. 1, FIG. 2 and FIG. 4, according to the illustrative embodiment, the single-poly, multi-cell per bit NVM unit 1 comprises a select transistor 21, a word line transistor 22, and two serially connected storage cells A and B between the select transistor 21 and the word line transistor 22. According to the illustrative embodiment, for example, the two serially connected storage cells A and B may be two serially connected single-poly floating gate transistors 31 and 32. One end of the two serially connected storage cells A and B is electrically coupled to a terminal of the select transistor 21 and the other end of the two serially connected storage cells A and B is electrically coupled to a terminal of the word line transistor 22. The select transistor 21, the word line transistor 22, and the two serially connected storage cells A and B may be formed directly on the OD region 100a.

According to the illustrative embodiment, the select transistor 21 may be an NMOS transistor and may comprise a source doping region 121 in the P well 101, a common doping region 122 spaced apart from the source doping region 121, a select gate channel region 210 near the main surface of the semiconductor substrate 100 between the source doping region 121 and the common doping region 122, a select gate (SG) 212 overlying the select gate channel region 210, and a gate dielectric layer 211 between the select gate 212 and the select gate channel region 210. In operation, the select gate (SG) 212 is coupled to a select gate voltage $V_{SG}$. According to the illustrative embodiment, the select gate (SG) 212 may be composed of an N$^+$ doped polysilicon gate, but is not limited thereto. Sidewall spacers (not shown) may be formed on opposite sidewalls of the select gate (SG) 212.

According to the illustrative embodiment, the source doping region 121 and the common doping region 122 may have the second conductivity type. For example, the source doping region 121 and the common doping region 122 may be N$^+$ doping regions. According to the illustrative embodiment, the source doping region 121 may be electrically coupled to a source line SL. In operation, a source line voltage $V_{SL}$ is applied to the source doping region 121.

According to the illustrative embodiment, the word line transistor 22 may be an NMOS transistor and may comprise a common doping region 124 in the P well 101, a drain doping region 125 spaced apart from the common doping region 124, a channel region 220 near the main surface of the semiconductor substrate 100 between the common doping region 124 and the drain doping region 125, a word line (WL) 222 overlying the channel region 220, and a gate dielectric layer 221 between the word line (WL) 222 and the channel region 220. In operation, the word line (WL) 222 is coupled to a word line voltage $V_{WL}$. According to the illustrative embodiment, the word line (WL) 222 may be composed of an N$^+$ doped polysilicon gate, but is not limited thereto. Sidewall spacers (not shown) may be formed on opposite sidewalls of the word line (WL) 222.

According to the illustrative embodiment, the common doping region 124 and the drain doping region 125 may have the second conductivity type. For example, the common doping region 124 and the drain doping region 125 may be N$^+$ doping regions. According to the illustrative embodiment, the drain doping region 125 may be electrically coupled to a bit line BL. In operation, a bit line voltage $V_{BL}$ is applied to the drain doping region 125.

According to the illustrative embodiment, the floating gate transistor 31 and 32 are formed directly on the OD region 100a. The floating gate transistor 31 is serially coupled to the select transistor 21 through the common doping region 122. The common doping region 122 is shared by the floating gate transistor 31 and the select transistor 21. According to the illustrative embodiment, the floating gate transistor 31 is serially connected to the floating gate transistor 32 through the common doping region 123.

The floating gate transistor 32 is serially coupled to the word line transistor 22 through the common doping region 124.

According to the illustrative embodiment, no contact elements are formed on the common doping regions 122, 123 and 124.

The floating gate transistor 31 comprises a floating gate (FG) 312 overlying the OD region 100a. According to the illustrative embodiment, the floating gate 312 consists of a single layer of polysilicon, for example, N+ doped polysilicon. According to the illustrative embodiment, the floating gate 312 is a single-poly gate. That is, no additional gate layer is stacked on the floating gate 312. The floating gate transistor 31 further comprises the common doping region 122 on one side of the floating gate (FG) 312, the common doping region 123 on the other side of the floating gate 312 that is opposite to the common doping region 122, a floating gate channel region 310 between the common doping region 122 and the common doping region 123, and a gate dielectric layer 311 between the floating gate 312 and the floating gate channel region 310. Sidewall spacers (not shown) may be formed on opposite sidewalls of the floating gate 312.

The floating gate transistor 32 comprises a floating gate (FG) 322 overlying the OD region 100a. According to the illustrative embodiment, the floating gate 322 consists of a single layer of polysilicon, for example, N+ doped polysilicon. According to the illustrative embodiment, the floating gate 322 is a single-poly gate. That is, no additional gate layer is stacked on the floating gate 312. The floating gate transistor 32 further comprises the common doping region 123 on one side of the floating gate (FG) 322, the common doping region 124 on the other side of the floating gate 322 that is opposite to the common doping region 123, a floating gate channel region 320 between the common doping region 123 and the common doping region 124, and a gate dielectric layer 321 between the floating gate 322 and the floating gate channel region 320. Sidewall spacers (not shown) may be formed on opposite sidewalls of the floating gate 322.

According to the illustrative embodiment, the floating gate transistors 31 and 32 serve as the charge storage element of the single-poly, multi-cell per bit NVM unit 1. The floating gate transistors 31 and 32 are operated (e.g., programmed or erased) in a synchronized manner. For example, after program operation, the two serially connected floating gate transistors 31 and 32 are both in the program state. After erase operation, the two serially connected floating gate transistors 31 and 32 are both in the erase state.

According to the illustrative embodiment, the channel region 210 has a channel length $L_1$, the channel region 220 has a channel length $L_3$, and the floating gate channel regions 310, 320 have a channel length $L_2$. According to the illustrative embodiment, $L_2$ is smaller than $L_1$ or $L_3$. For example, $L_2$ may be 50~90% of $L_1$ or $L_3$.

According to the illustrative embodiment, the floating gate transistor 31 is disposed in close proximity to the floating gate transistor 32. According to the illustrative embodiment, the distance (or spacing) $S_2$ between the floating gates 312, 322 is smaller than the distance (or spacing) $S_1$ between the select gate (SG) 212 and the floating gate 312 or the distance $S_3$ between the word line (WL) 222 and the floating gate 322.

As can be seen in FIG. 1 and FIG. 3, according to the illustrative embodiment, the single-poly, multi-cell per bit NVM unit 1 further comprises floating gate extensions 312a, 322a continuously extending from the floating gates 312, 322, respectively, to the OD region 100b and adjacent to an erase gate (EG) region 30, which is electrically coupled to an erase line EL. As can be seen in FIG. 3, the floating gate extension 322a traverses the trench isolation region 110 between the OD region 100a and the OD region 100b and partially overlaps with the OD region 100b so as to capacitively couple to the EG region 30. The floating gate extension 322a may have a slender shape when viewed from the above and extends along a second direction or the reference y-axis. According to the illustrative embodiment, the first direction is orthogonal to the second direction.

The EG region 30 may comprise a heavily doped region 302 such as a P+ doping region adjacent to the floating gate extension 322a. In operation, such as an erase operation, the heavily doped region 302 is electrically coupled to the erase line voltage ($V_{EL}$). According to the illustrative embodiment, the erasing operation for the single-poly, multi-cell per bit NVM unit 1 involves a tunneling mechanism that concurrently removes electrons from the floating gates 312, 322 via the floating gate extensions 312a, 322a.

According to the illustrative embodiment, the single-poly, multi-cell per bit NVM unit 1 further comprises floating gate extensions 312b, 322b continuously extending from the floating gates 312, 322, respectively, to the OD region 100c, which is opposite to the OD region 100b. Each of the floating gate extensions 312b, 322b may comprise an expanded head portion that is capacitively coupled to a control gate (CG) region 40 in the OD region 100c so as to provide a larger coupling ratio. The CG region 40 is electrically coupled to a control line (CL).

The CG region 40 may comprise a heavily doped region 402 such as a P+ doping region adjacent to the floating gate extension 322b. In operation, a control line voltage $V_{CL}$ is applied to the heavily doped region 402.

According to the illustrative embodiment, each of the single-poly floating gate transistors 31 and 32 has a threshold voltage ($V_{TH}$) that is smaller than the threshold voltage of the select transistor 21 or the threshold voltage of the word line transistor 22.

FIG. 5 is a table showing operating conditions for programming, erasing or reading the single-poly, multi-cell per bit NVM unit 1 in FIG. 4 according to one embodiment of the invention. For example, during a program (PGM) operation for the NVM unit 1, the control line voltage $V_{CL}$ provided to the heavily doped region 402 is $V_{PP}$. The erase line voltage $V_{EL}$ provided to the heavily doped region 302 is $V_{PP}$ ($V_{CL}=V_{EL}=V_{PP}$). The select gate voltage $V_{SG}$ provided to the select gate 212 of the select transistor 21 is $V_{DD}$. The word line voltage $V_{WL}$ provided to the word line 222 of the word line transistor 22 is also $V_{DD}$ ($V_{SG}=V_{WL}=V_{DD}$), wherein $V_{PP}>V_{DD}>0V$. The source line voltage $V_{SL}$ provided to the source doping region 121 of the select transistor 21 is 0V ($V_{SL}=0V$). The bit line voltage $V_{BL}$ is 0V ($V_{BL}=0V$). The substrate voltage $V_{P-Sub}$ applied to the semiconductor substrate 100 is 0V. Under these conditions, electrons are injected into the floating gates 312 and 322 through Fowler-Nordheim (FN) tunneling mechanism.

During an erase (ERS) operation for the NVM unit 1, the control line voltage $V_{CL}$ provided to the heavily doped region 402 is 0V ($V_{CL}=0V$). The erase line voltage $V_{EL}$ provided to the heavily doped region 302 is $V_{PP}$ ($V_{EL}=V_{PP}$). The select gate voltage $V_{SG}$ provided to the select gate 212 of the select transistor 21 is $V_{DD}$. The word line voltage $V_{WL}$ provided to the word line 222 of the word line transistor 22 is also $V_{DD}$ ($V_{SG}=V_{WL}=V_{DD}$), wherein $V_{PP}>V_{DD}>0V$. The source line voltage $V_{SL}$ provided to the source doping region 121 of the select transistor 21 is 0V ($V_{SL}=0V$). The bit line voltage $V_{BL}$ is 0V ($V_{BL}=0V$). The substrate voltage $V_{P-Sub}$ applied to the semiconductor substrate 100 is 0V. Under these conditions, electrons are pulled out from the floating gates 312 and 322 through FN tunneling mechanism. Since the nonvolatile memory structure is a multi-cells-per-bit structure, the bit failure rate of the memory array can be strongly reduced.

Figure 6:
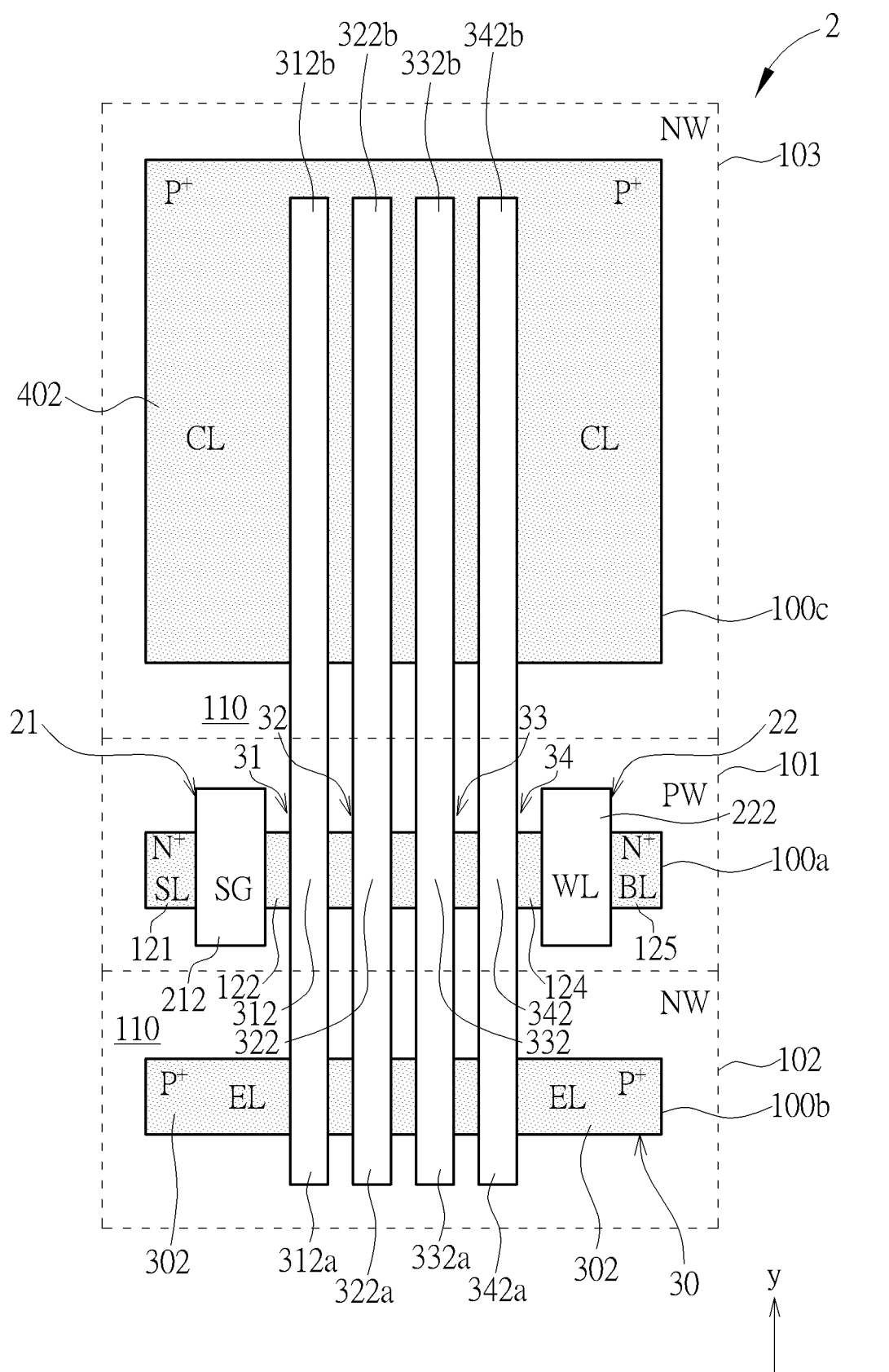
FIG. 6 is a schematic plan view showing an exemplary layout of a single-poly, multi-cell per bit NVM unit in accordance with another embodiment of this invention.

FIG. 6 is a schematic plan view showing an exemplary layout of a single-poly, multi-cell per bit NVM unit in accordance with another embodiment of this invention, wherein like numeral numbers designate like regions, layers or elements. As shown in FIG. 6, the exemplary single-poly, multi-cell per bit NVM unit 2 comprises four serially connected storage floating gate transistors 31~34 so as to form a string of storage cells A~D between the select transistor 21 and the word line transistor 22. The floating gate transistor 31 and 32 are formed directly on the OD region 100a. The floating gate transistor 31 is serially coupled to the select transistor 21 through the common doping region 122. The common doping region 122 is shared by the floating gate transistor 31 and the select transistor 21. According to the illustrative embodiment, the floating gate transistor 34 is serially coupled to the word line transistor 22 through the common doping region 124.

According to the illustrative embodiment, likewise, the floating gate extensions 312a, 322a, 332a, 342a continuously extend from the floating gates 312, 322, 332, 342, respectively, to the OD region 100b and are adjacent to an erase gate (EG) region 30, which is coupled to an erase line EL. The floating gate extension 312a, 322a, 332a, 342a may have a slender shape when viewed from the above and extends along the second direction or the reference y-axis.

The floating gate extensions 312b, 322b, 332b, 342b continuously extend from the floating gates 321, 322, 332, 342, respectively, to the OD region 100c, which is opposite to the OD region 100b. Unlike the NVM unit 1 in FIG. 1, each of the floating gate extensions 312b, 322b, 332b, 342b does not comprise an expanded head portion. The floating gate extension 312b, 322b, 332b, 342b have a slender shape when viewed from the above and extends along the second direction or the reference y-axis. According to the illustrative embodiment, the floating gate extension 312b, 322b, 332b, 342b and the floating gate extensions 312a, 322a, 332a, 342a may have the same line width.

Figure 7:
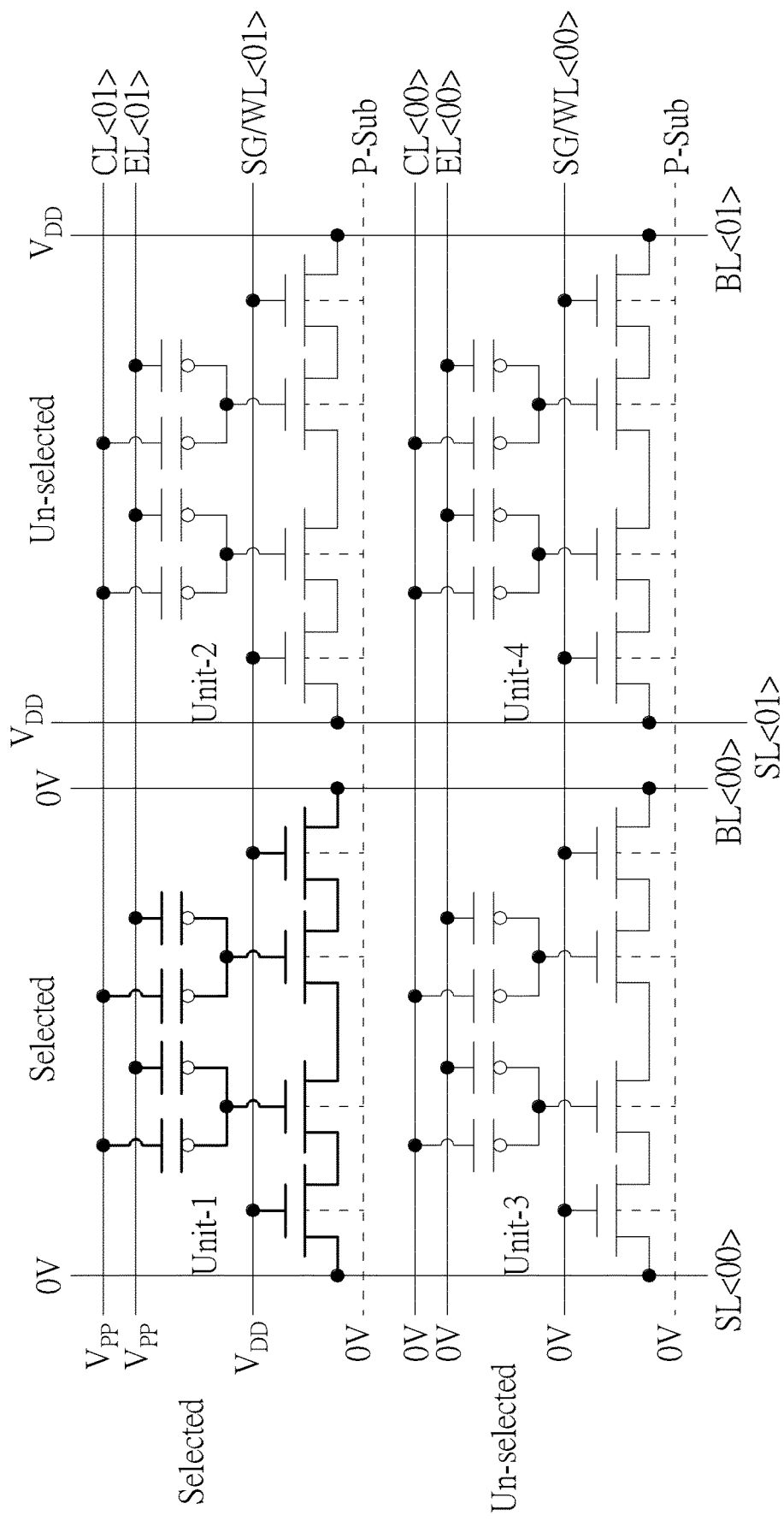
FIG. 7 to FIG. 9 are schematic circuit diagram showing a portion of a nonvolatile memory array composed of the single-poly, multi-cell per bit NVM unit as set forth in FIG. 1 to FIG. 4 as well as operating conditions for the memory array according to embodiments of the invention.
Figure 8:
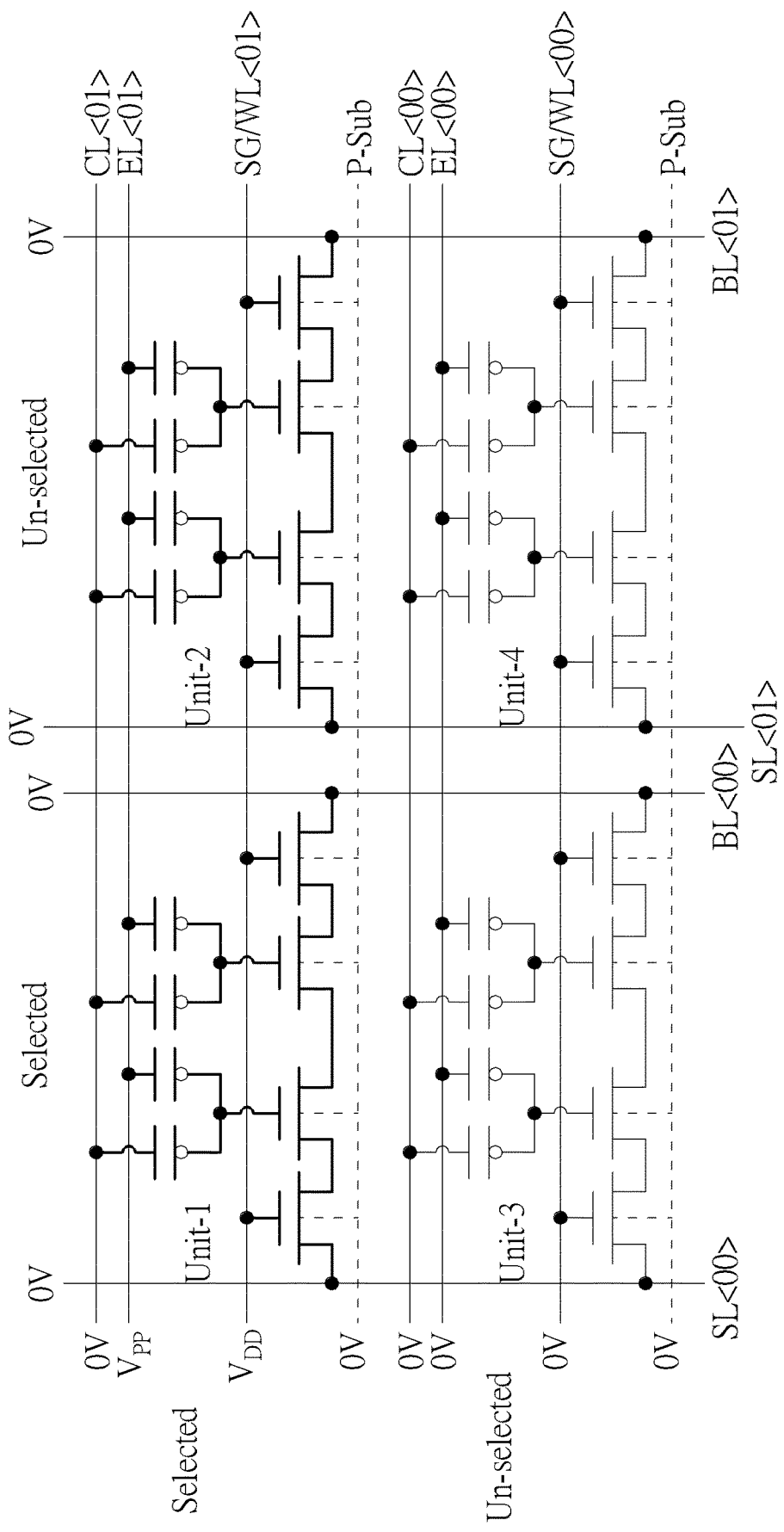
Figure 9:
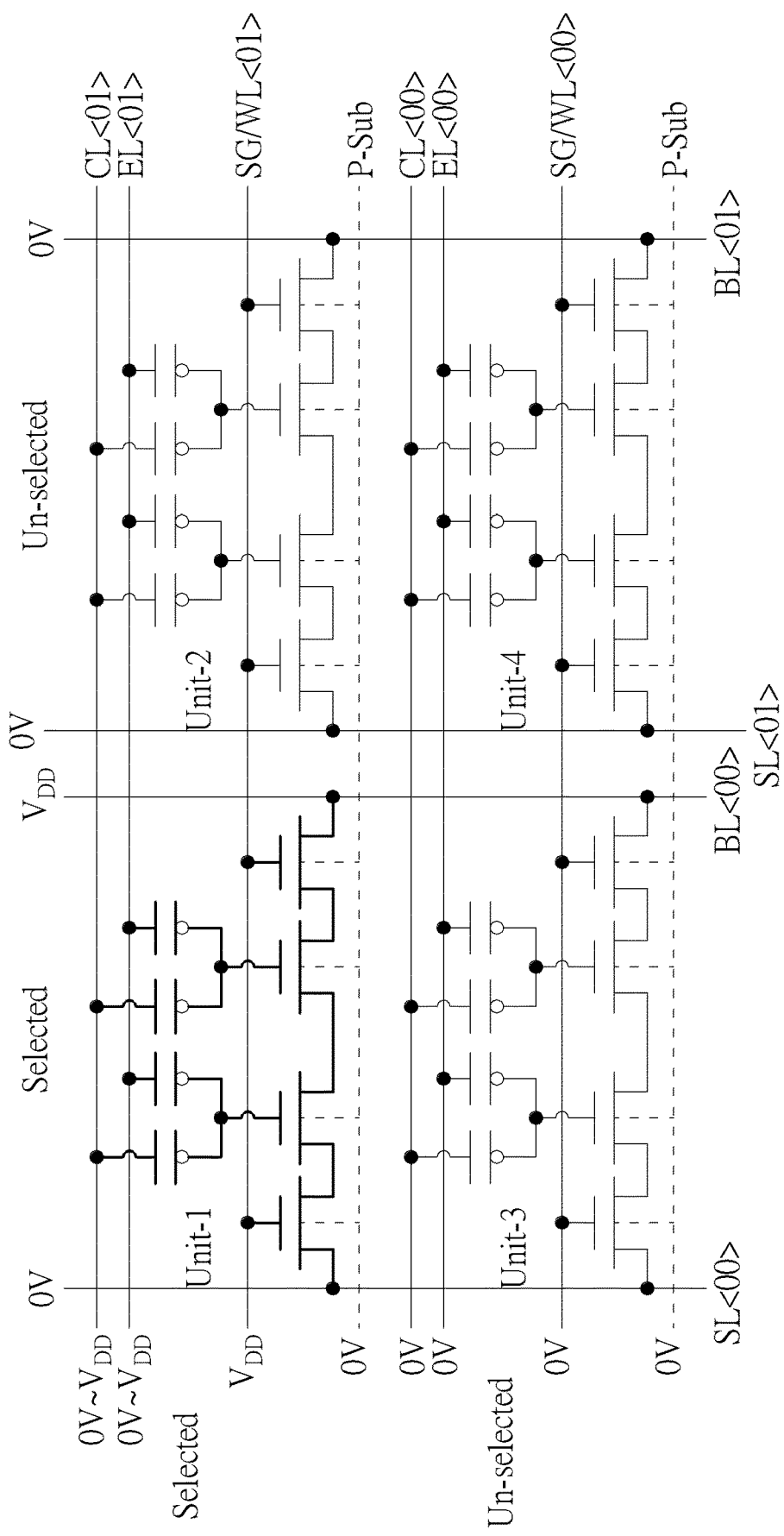

FIG. 7 to FIG. 9 are schematic circuit diagram showing a portion of a nonvolatile memory array composed of the single-poly, multi-cell per bit NVM unit as set forth in FIG. 1 to FIG. 4 according to embodiments of the invention. For the sake of simplicity, only a 2 unit x2 unit memory array is shown. The operating conditions for the 2 unit x2 unit memory array are also demonstrated.

As shown in FIG. 7, the memory unit Unit-1 is selected and programmed. A voltage $V_{PP}$ is applied to the control line CL<01>. A voltage $V_{PP}$ is applied to the erase line EL<01>. A voltage $V_{DD}$ is applied to the select gate/word line SG/WL<01>, wherein $V_{PP} > V_{DD} > 0V$. The source line SL<00> and the bit line BL<00> are grounded. The substrate voltage $V_{P-Sub}$ applied to the semiconductor substrate P-Sub is 0V.

For the un-selected memory unit Unit-2 on the same row of the array, program inhibit operating conditions are employed. A voltage $V_{PP}$ is applied to the control line CL<01>. A voltage $V_{PP}$ is applied to the erase line EL<01>. A voltage $V_{DD}$ is applied to the select gate/word line SG/WL<01>. A voltage $V_{DD}$ is applied to the source line SL<01> and the bit line BL<01>. The substrate voltage $V_{P-Sub}$ applied to the semiconductor substrate P-Sub is 0V.

For the un-selected memory unit Unit-3, a voltage 0V is applied to the control line CL<00>. A voltage 0V is applied to the erase line EL<00>. A voltage 0V is applied to the select gate/word line SG/WL<00>. The source line SL<00> and the bit line BL<00> are grounded. The substrate voltage $V_{P-Sub}$ applied to the semiconductor substrate P-Sub is 0V.

For the un-selected memory unit Unit-4, a voltage 0V is applied to the control line CL<00>. A voltage 0V is applied to the erase line EL<00>. A voltage 0V is applied to the select gate/word line SG/WL<00>. A voltage $V_{DD}$ is applied to the source line SL<01> and the bit line BL<01>. The substrate voltage $V_{P-Sub}$ applied to the semiconductor substrate P-Sub is 0V.

As shown in FIG. 8, the memory units Unit-1 and Unit-2 are selected and erased. A voltage 0V is applied to the control line CL<01>. A voltage $V_{PP}$ is applied to the erase line EL<01>. A voltage $V_{DD}$ is applied to the select gate/word line SG/WL<01>, wherein $V_{PP} > V_{DD} > 0V$. The source lines SL<00>, SL<01> and the bit line BL<00>, BL<01> are grounded. The substrate voltage $V_{P-Sub}$ applied to the semiconductor substrate P-Sub is 0V.

For the un-selected memory units Unit-3 and Unit-4, a voltage 0V is applied to the control line CL<00>. A voltage 0V is applied to the erase line EL<00>. A voltage 0V is applied to the select gate/word line SG/WL<00>. The source lines SL<00>, SL<01> and the bit line BL<00>, BL<01> are grounded. The substrate voltage $V_{P-Sub}$ applied to the semiconductor substrate P-Sub is 0V.

As shown in FIG. 9, the memory unit Unit-1 is selected and read. Under the read mode operation, a voltage $0V \sim V_{DD}$ (e.g., 0~5V) is applied to the control line CL<01>. A voltage $0V \sim V_{DD}$ (e.g., 0~5V) is applied to the erase line EL<01>. A voltage $V_{DD}$ is applied to the select gate/word line SG/WL<01>. The source line SL<00> is grounded. A voltage $V_{DD}$ is applied to the bit line BL<00>. The substrate voltage $V_{P-Sub}$ applied to the semiconductor substrate P-Sub is 0V.

For the un-selected memory unit Unit-2 on the same row of the array, a voltage $0V \sim V_{DD}$ is applied to the control line CL<01>. A voltage $0V \sim V_{DD}$ is applied to the erase line EL<01>. A voltage $V_{DD}$ is applied to the select gate/word line SG/WL<01>. A voltage 0V is applied to the source line SL<01> and the bit line BL<01>. The substrate voltage $V_{P-Sub}$ applied to the semiconductor substrate P-Sub is 0V.

For the un-selected memory unit Unit-3, a voltage 0V is applied to the control line CL<00>. A voltage 0V is applied to the erase line EL<00>. A voltage 0V is applied to the select gate/word line SG/WL<00>. The source line SL<00> is grounded. A voltage $V_{DD}$ is applied to the bit line BL<00>. The substrate voltage $V_{P-Sub}$ applied to the semiconductor substrate P-Sub is 0V.

For the un-selected memory unit Unit-4, a voltage 0V is applied to the control line CL<00>. A voltage 0V is applied to the erase line EL<00>. A voltage 0V is applied to the select gate/word line SG/WL<00>. The source line SL<01> and the bit line BL<01> are grounded. The substrate voltage $V_{P-Sub}$ applied to the semiconductor substrate P-Sub is 0V.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-cell per bit nonvolatile memory (NVM) unit, comprising:
    a semiconductor substrate comprising a first oxide define (OD) region, a second oxide define (OD) region, and a third oxide define (OD) region separated from one another by a trench isolation region, wherein the first, second and third OD regions are in parallel to one another and extend along a first direction, and wherein the first OD region is situated between the second OD region and the third OD region;

a select transistor disposed on the first OD region;

a word line transistor disposed on the first OD region; and serially connected single-poly floating gate transistors disposed on the first OD region;

wherein each of the serially connected single-poly floating gate transistors comprises a first floating gate extension continuously extending toward the second OD region along a second direction and adjacent to an erase gate region disposed in the second OD region;

wherein each of the serially connected single-poly floating gate transistors comprises a second floating gate extension continuously extending toward the third OD region along the second direction and wherein the second floating gate extension is capacitively coupled to a control gate region in the third OD region;

wherein during a program operation, electrons are injected through the serially connected single-poly floating gate transistors;

wherein each of the serially connected single-poly floating gate transistors has a threshold voltage that is smaller than that of the select transistor or the word line transistor.

2. The multi-cell per bit NVM unit according to claim 1, wherein the first OD region is disposed within a P well.

3. The multi-cell per bit NVM unit according to claim 1, wherein one end of the serially connected single-poly floating gate transistors is electrically connected to a terminal of the select transistor.

4. The multi-cell per bit NVM unit according to claim 3, wherein the other end of the serially connected single-poly floating gate transistors is electrically coupled to a terminal of the word line transistor.

5. The multi-cell per bit NVM unit according to claim 2, wherein the select transistor is an NMOS select transistor and comprises an $N^+$ source doping region in the P well, a first $N^+$ common doping region spaced apart from the $N^+$ source doping region, a select gate channel region between the $N^+$ source doping region and the $N^+$ common doping region, and a select gate overlying the select gate channel region.

6. The multi-cell per bit NVM unit according to claim 5, wherein the $N^+$ source doping region is electrically coupled to a source line.

7. The multi-cell per bit NVM unit according to claim 5, wherein the serially connected single-poly floating gate transistors is electrically coupled to the select gate transistor through the first $N^+$ common doping region.

8. The multi-cell per bit NVM unit according to claim 2, wherein the word line transistor is an NMOS word line transistor and comprises a second $N^+$ common doping region in the P well, an $N^+$ drain doping region spaced apart from the second $N^+$ common doping region, a channel region between the second $N^+$ common doping region and the $N^+$ drain doping region, and a word line overlying the channel region.

9. The multi-cell per bit NVM unit according to claim 8, wherein the $N^+$ drain doping region is electrically coupled to a bit line.

10. The multi-cell per bit NVM unit according to claim 8, wherein the serially connected single-poly floating gate transistors is electrically coupled to the word line transistor through the second $N^+$ common doping region.

11. The multi-cell per bit NVM unit according to claim 1, wherein the plurality of serially connected storage cells are operated in a synchronized manner.

12. The multi-cell per bit NVM unit according to claim 1, wherein the second OD region is disposed within an N well.

13. The multi-cell per bit NVM unit according to claim 1, wherein the third OD region is disposed within an N well.

14. The multi-cell per bit NVM unit according to claim 1, wherein the erase gate region is electrically coupled to an erase line.

15. The multi-cell per bit NVM unit according to claim 1, wherein the first floating gate extension traverses the trench isolation region between the first OD region and the second OD region and partially overlaps with the second OD region so as to capacitively couple to the erase gate region.

16. The multi-cell per bit NVM unit according to claim 1, wherein the control gate region is electrically coupled to a control line.

17. The multi-cell per bit NVM unit according to claim 1, wherein a channel length of each of the serially connected single-poly floating gate transistors is shorter than that of the select transistor or the word line transistor.

18. A nonvolatile memory device, comprising:

an array of the multi-cell per bit NVM units according to claim 1.

* * * * *